dimethylbenzyl ether, hydroxymethoxymethoxymethoxymethyl 2,4-dimethylbenzyl ether, etc. It is to be understood that the aforementioned ethers are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example a mixture of 0.18 mole of benzyl chloride and 0.66 mole of formaldehyde which was added as approximately 37% aqueous formaldehyde and which contained about 15% methyl alcohol was placed in the glass liner of a rotating autoclave along with 2 g. (0.01 mole) of palladium chloride. The liner was sealed into the autoclave, the autoclave was heated at 90–110° C. for a period of 5 hours. At the end of this time heating was discontinued, the autoclave was allowed to return to room temperature and the reaction mixture was recovered. The reaction product consisted of a clear yellow aqueous lower layer, pale amber upper layer and a black powder which indicated that the reduction of the palladium salt of palladium metal had occurred. The organic layer was separated from the aqueous lower layer and submitted to preparative gas-liquid chromatography. The results from this chromatographic analysis disclosed the presence of methoxymethyl benzyl ether, methoxymethoxymethyl benzyl ether and methoxymethoxymethoxymethyl benzyl ether.

EXAMPLE II

Another example was performed in which 0.17 mole of benzyl chloride and 0.68 mole of an aqueous solution containing approximately 37% formaldehyde, said solution also containing about 15% methyl alcohol was placed in the glass liner of a rotating autoclave. In addition, a mixture of 2 g. of palladium chloride and 2 g. of cupric chloride was also placed in the liner. The liner was sealed and 15 atmospheres each of air and nitrogen was charged to the autoclave. The autoclave was then heated at 90–110° C. for a period of 5 hours. At the end of this time the autoclave was allowed to return to room temperature, the excess pressure was discharged and the reaction mixture was recovered. The mixture was subjected to separation and analysis in a manner similar to that set forth in Example I, the preparative gas-liquid chromatographic analysis disclosing the presence of methoxymethyl benzyl ether, methoxymethoxymethyl benzyl ether and methoxymethoxymethyl benzyl ether.

EXAMPLE III

A mixture of 0.16 mole of benzyl chloride and 0.56 mole of formaldehyde which is added as approximately a 37% aqueous solution, said formaldehyde also containing about 15% methyl alcohol, was placed in the glass liner of a rotating autoclave. In addition, the autoclave also contained 2 g. of ruthenium chloride. The autoclave was then heated 90–100° C. for a period of 5 hours. At the end of this time the product was recovered and analyzed in the manner set forth in Example I. The analysis disclosed the presence of a major portion of methoxymethylbenzyl ether with a minor portion of methoxymethoxymethyl benzyl ether and a trace of methoxymethoxymethoxymethyl benzyl ether.

EXAMPLE IV

In this example a mixture of 0.20 mole of benzyl chloride, 0.66 mole of formaldehyde which is added as an approximately 37% aqueous solution containing 15% ethyl alcohol and 2 g. each of palladium chloride and copper chloride is placed in the glass liner of a rotating autoclave. The liner is sealed into the autoclave and air and nitrogen pressed in until an initial operating pressure of 30 atmospheres is reached. The autoclave is heated to a temperature of 100° C. and maintained thereat for a period of 4 hours. At the end of this time heating is discontinued, the excess pressure is discharged an dthe autoclave is opened. Analysis of the organic layer, after separation from the aqueous layer will disclose the presence of ethoxymethyl benzyl ether, ethoxymethoxymethyl benzyl ether and ethoxymethoxymethoxymethylbenzyl ether.

EXAMPLE V

A mixture of 0.20 mole of 2-methylbenzyl chloride and 0.66 mole of a 37% aqueous formaldehyde solution containing 15% methyl alcohol along with 2 g. of ruthenium chloride is placed in a reaction flask and heated to reflux. After a predetermined residence time of 6 hours elapses, heating is discontinued and the organic layer is separated from the aqueous layer and reduced ruthenium metal. After treatment in a manner similar to that set forth in Example I above, it will be determined that the product will contain methoxymethyl 2-methylbenzyl ether together with smaller amounts of methoxymethoxymethyl 2-methylbenzyl ether and methoxymethoxymethoxymethyl 2-methylbenzyl ether.

EXAMPLE VI

A mixture of benzyl chloride and a 37% aqueous formaldehyde solution is placed in the glass liner of a rotating autoclave along with a catalytic amount of palladium chloride and cupric chloride. The liner is sealed into the autoclave and a mixture of air and nitrogen is pressed in until an intial operating pressure of 30 atmospheres is reached. The autoclave is heated to a temperature of 100° C. and maintained thereat for a period of 5 hours. At the end of this time heating is discontinued, the autoclave is allowed to return to room temperature and the excess pressure is discharged. After recovery the reaction product is analyzed in a manner similar to that set forth in Example I above. This analysis will determine the presence of hydroxymethyl benzyl ether, hydroxymethoxymethyl benzyl ether and hydroxymethoxymethoxymethyl benzyl ether.

EXAMPLE VII

In this example a mixture of 0.20 mole of benzyl chloride and 0.70 mole of a 37% aqueous formaldehyde solution containing 15% decyl alcohol is treated in a manner similar to that set forth in Example I above, that is, by placing the mixture in a rotating autoclave along with 2 cc. of a palladium compound. The autoclave is heated to a temperature of 100° C. and maintained thereat for a period of 5 hours. At the end of this time heating is discontinued and the reaction product is recovered. The upper organic layer is separated from the lower aqueous layer and reduced palladium and analyzed. The Preparative Gas-Liquid Chromatographic spectrum will disclose the presence of decoxymethyl benxyl ether, decoxymethoxymethyl benzyl ether and decoxymethoxymethoxymethyl benzyl ether.

I claim as my invention:

1. A process for the preparation of a methylene ether of a benzylic alcohol which comprises reacting a benzyl chloride with aqueous formaldehyde in the presence of a halide of a metal selected from the group consisting of ruthenium, rhodium, palladium, osmium, iridium, and platinum at an elevated temperature in a range of from about 50° to about 200° C., and recovering the resultant methylene ether of a benzylic alcohol.

2. The process as set forth in claim 1 being effected in the presence of an alcohol.

3. The process as set forth in claim 1 being effected in the presence of cupric chloride and air.

4. The process as set forth in claim 1 in which said metal halide is palladium chloride.

5. The process as set forth in claim 1 in which said metal halide is ruthenium chloride.

6. The process as set forth in claim 2 in which said benzyl chloride is benzyl chloride, said alcohol is methyl alcohol and said methylene ether of a benzylic alcohol is methoxymethyl benzyl ether, methoxmethoxymethyl benzyl ether or methoxymethoxymethoxymethyl benzyl ether.

7. The process as set forth in claim 2 in which said benzyl chloride is benzyl chloride, said alcohol is ethyl alcohol and said methylene ether is a benzylic alcohol is ethoxymethyl benzyl ether, ethoxymethoxymethyl benzyl ether or ethoxymethoxymethoxymethyl benzyl ether.

8. The process as set forth in claim 2 in which said benzyl chloride is 2-methylbenzyl chloride, said alcohol is methyl alcohol and said methylene ether of a benzylic alcohol is methoxymethyl 2-methylbenzyl ether, methoxymethoxymethyl 2-methylbenzyl ether or methoxymethoxymethoxymethyl 2-methylbenzyl ether.

9. The process as set forth in claim 1 in which said benzyl chloride is benzyl chloride and said methylene ether of a benzylic alcohol is hydroxymethyl benzyl ether, hydroxymethoxymethyl benzyl ether of hydroxymethoxymethoxymethyl benzyl ether.

10. The process as set forth in claim 2 in which said benzyl chloride is benzyl chloride, said alcohol is decyl alcohol and said methylene ether of a benzylic alcohol is decoxymethyl benzyl ether, decoxymethoxymethyl benzyl ether or decoxymethoxymethoxymethyl benzyl ether.

References Cited

UNITED STATES PATENTS 3,367,976   2/1968   Larkin _____ 260—611 A

FOREIGN PATENTS 235,662   7/1959   Australia _____ 260—611 A
393,937   6/1933   Great Britain _____ 260—611 A

OTHER REFERENCES

Frank et al., Ind. & Eng. Chem., vol. 46 (1954) 1019–1021.

BERNARD HELFIN, Primary Examiner 3,649,697
PREPARATION OF ETHERS
Louis Schmerling, Riverside, Ill., assignor to Universal
Oil Products Company, Des Plaines, Ill.
No Drawing. Filed Mar. 11, 1970, Ser. No. 18,697
Int. Cl. C07c 43/20
U.S. Cl. 260—611 A          10 Claims

ABSTRACT OF THE DISCLOSURE

Methylene ethers of benzylic alcohols are prepared by reacting a benzyl chloride with formaldehyde in the presence of certain catalysts such as metal halides to form the desired product. The reaction is exemplified by the preparation of methoxymethyl benzyl ether by reacting benzyl chloride with formaldehyde in the presence of noble metal halides at elevated temperatures of from about 50° to about 200° C.

---

This invention relates to a novel method for the preparation of methylene ethers of benzylic alcohols. More particularly, the invention is concerned with the reaction of benzyl chlorides with formaldehyde in the presence of certain catalytic compositions of matter hereinafter set forth in greater detail to form methylene ethers of benzylic alcohols.

The methylene ethers of benzylic alcohols which are prepared according to the process hereinafter described are useful compounds in the chemical field. The most important use for these compounds is as solvents for various reactions. Due to the particular chemical structure of these ethers, the compounds form useful solvents inasmuch as they will be miscible with many and varied reactants, those which are soluble in aqueous solutions and those which are soluble in conventional organic solvents. Thus, for example, a methylene ether such as methoxymethoxymethoxymethyl benzyl ether may be used where one of the reactants is generally soluble in an aqueous solution and the other reactant is generally solvent in an organic compound. In addition, the ethers may also be used as disinfectants or preservatives.

It is therefore an object of this invention to provide a novel method for the preparation of methylene ethers of benzylic alcohols.

A further object of this invention is to effect the reaction of a benzyl chloride with formaldehyde in the presence of certain catalytic compositions of matter to form methylene ethers of benzylic alcohols.

In one aspect an embodiment of this invention resides in a process for the preparation of a methylene ether of a benzylic alcohol which comprises reacting a benzyl chloride with aqueous formaldehyde in the presence of a halide of a noble metal of Group VIII of the Periodic Table at an elevated temperature, and recovering the resultant methylene ether of a benzylic alcohol.

A specific embodiment of this invention is found in a process for the preparation of a methylene ether of a benzylic alcohol which comprises reacting benzyl chloride with aqueous formaldehyde in the presence of palladium chloride and methyl alcohol at a temperature in the range of from about 50° to about 200° C., and recovering the resultant methoxymethyl benzyl ether, methoxymethoxymethyl benzyl ether or methoxymethoxymethoxymethyl benzyl ether.

Other objects and embodiments will be found in the following further details description of the present invention.

As hereinbefore set forth the present invention is concerned with a process for the preparation of methylene ethers of benzylic alcohols. The desired products are prepared by reacting a benzyl chloride with formaldehyde in which the formaldehyde is present in an aqueous state, in the presence of certain compounds comprising halides of a noble metal of Group VIII of the Periodic Table. The benzyl chlorides which are reacted with the aqueous formaldehyde will possess the generic formula

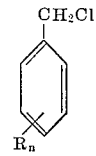

in which R is selected from the group consisting of hydrogen, alkyl, aryl, aralkyl, alkaryl and cycloalkyl radicals, and $n$ is an integer of from 0 to 5. Some specific examples of these compounds will include benzyl chloride, 2-methylbenzyl chloride, 3-methylbenzyl chloride, 4-methylbenzyl chloride, ethylbenzyl chloride, 2-ethylbenzyl chloride, 3-ethylbenzyl chloride, 4-ethylbenzyl chloride, n-propylbenzyl chloride, 2-n-propylbenzyl chloride, 3-n-propylbenzyl chloride, 4-n-propylbenzyl chloride, isopropylbenzyl chloride, 2-isopropylbenzyl chloride, 3-isopropylbenzyl chloride, 4-isopropylbenzyl chloride, n-butylbenzyl chloride, 2-n-butylbenzyl chloride, 3-n-butylbenzyl chloride, 4-n-butylbenzyl chloride, t-butylbenzyl chloride, 2-t-butylbenzyl chloride, 3-t-butylbenzyl chloride, 4-t-butylbenzyl chloride, 2,3 - dimethylbenzyl chloride, 2,3-diethylbenzyl chloride, 2,3 - di - n-propylbenzyl chloride, 2,4-dimethylbenzyl chloride, 2,4- diethylbenzyl chloride, 2,4 - isopropylbenzyl chloride, 2,4 - n-butylbenzyl chloride, 2,6-dimethylbenzyl chloride, 2,6-di-ethylbenzyl chloride, 2,6-di-n-propylbenzyl chloride, 2,6-diisopropylbenzyl chloride, etc., 3-phenylbenzyl chloride, 3-benzylbenzyl chloride, 3-o-tolylbenzyl chloride, 3-m-tolylbenzyl chloride, 3 - p-tolylbenzyl chloride, 3-cyclopentylbenzyl chloride, 3 - cyclohexylbenzyl chloride, 4-phenylbenzyl chloride, 4-benzylbenzyl chloride, 4-o-tolylbenzyl chloride, 4-m-tolylbenzyl chloride, 4-p-tolylbenzyl chloride, 4 - cyclopentylbenzyl chloride, 4 - cyclohexylbenzyl chloride, etc. It is to be understood that the aforementioned benzyl chlorides are only representative of the class of compounds which may be used, and that the present invention is not necessarily limited thereto.

It is also contemplated within the scope of this invention that the reaction may be effected in the presence of an alcohol including the aliphatic alcohols containing from 1 to about 20 carbon atoms such as methyl alcohol, ethyl alcohol, n-propyl alcohol, isopropyl alcohol, the isomeric butyl alcohols, amyl alcohols, hexyl alcohols, heptyl alcohols, octyl alcohols, nonyl alcohols, decyl alcohols, undecyl alcohols, dodecyl alcohols, tridecyl alcohols, tetradecyl alcohols, pentadecyl alcohols, hexadecyl alcohols, heptadecyl alcohols, octadecyl alcohols, nonadecyl alcohols, eicosyl alcohols. The presence of these alcohols in the mixture will result in the formation of alkoxy methylene ethers of a benzylic alcohol.

The reaction is effected at elevated temperatures ranging from about 50° up to about 200° C. and at ambient pressures. In addition, the reaction is effected in the presence of a halide of a noble metal of Group VIII of the Periodic Table, representative examples of these halides being ruthenium chloride, rhodium chloride, palladium chloride, osmium chloride, iridium chloride, and platinum chloride. It is also contemplated within the scope of this invention that the corresponding bromides and iodides may also be used, although not necessarily with equivalent results. In addition, if so desired, the reaction may be effected in the presence of an added amount of cupric chloride and air in order that the halide of the noble metal may be regenerated in situ and, therefore, act as a catalyst for the reaction rather than entering into the reaction and decomposing, thereby requiring that additional amounts of noble metal halides be added to the reaction mixture. When utilizing cupric chloride the process may be effected at superatmospheric pressures ranging from 2 to about 100 atmospheres, said pressure being provided for by the introduction of air and, if desired, a substantially inert gas such as nitrogen into the reaction vessel.

The process of this invention may be effected in any suitable manner and may comprise either a batch or continuous type operation. For example, when a batch type operation is used, a quantity of the particular benzyl chloride and aqueous formaldehyde are charged to an appropriate apparatus containing the halide of a noble metal of Group VIII of the Periodic Table and, if so desired, cupric chloride. When effecting the reaction at atmospheric pressure, the process is carried out usually at reflux temperature. However, when utilizing superatmospheric pressures the process will be effected in an apparatus such as an autoclave of the rotating or mixing type. After bringing the reaction vessel to the proper operating conditions of temperature and pressure, the reaction is allowed to proceed for a predetermined period of time which may range from 0.5 up to about 10 hours or more in duration. Upon completion of the desired residence time the apparatus is allowed to return to room temperature, the excess pressure, if any, is discharged and the reaction mixtures recovered. After separation from the halide of the noble metal of Group VIII of the Periodic Table, the organic layer is separated from the aqueous layer. The organic layer is then subjected to conventional means of purification such as extraction, washing, drying, followed by fractional distillation, usually under reduced pressure, whereby the desired methylene ether of benzyl alcohol is recovered. It is to be understood that when an alkoxymethylene ether is the desired product, the alcohol is added to the charge stock prior to subjecting the mixture to reaction conditions. In addition, when it is desired that the halide of the noble metal of Group VIII of the Periodic Table is to act in a catalytic manner and is to be prevented from deteriorating during the reaction that a small amount of cupric chloride will also be present in the reaction mixture along with air thereby converting the noble metal after reduction of the noble metal chloride, back to the noble metal chloride by oxidation.

It is also contemplated within the scope of this invention that the process may be effected in a continual manner. When such a type of operation is used, the starting materials comprising the particular benzyl chloride and the aqueous formaldehyde along with, if so desired, an alcohol are continuously charged to a reaction vessel which is maintained at the proper operating conditions of temperature and pressure and which contains the halide of the noble metal of Group VIII of the Periodic Table such as palladium chloride or ruthenium chloride along with a small amount of cupric chloride. In addition, a measured amount of an oxygen-containing gas such as air is also continuously charged to the reactor to provide the oxidative means for recovering the metallic noble metal back to the halide form thereof. After a predetermined residence time has elapsed the reactor effluent is continuously withdrawn and subjected to conventional means of separation and purification whereby the unconverted particular benzyl chloride and formaldehyde are recycled to form a portion of the feed stock while the desired ethers are recovered, separated, and sent to storage.

Examples of methylene ethers of benzylic alcohols which may be prepared according to the process of this invention will possess the generic formula:

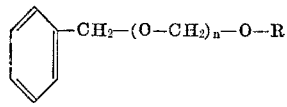

in which R is hydrogen or an alkyl radical of from 1 to about 20 carbon atoms and $n$ is an integer of from 1 to 3. Some specific examples of these ethers will include methoxymethyl benzyl ether, ethoxymethyl benzyl ether, propoxymethyl benzyl ether, butoxymethyl benzyl ether, hexoxymethyl benzyl ether, heptoxymethyl benzyl ether, decoxymethyl benzyl ether, dodecoxymethyl benzyl ether, tridecoxymethyl benzyl ether, methoxymethoxymethyl benzyl ether, ethoxymethoxymethyl benzyl ether, propoxymethoxymethyl benzyl ether, butoxymethoxymethyl benzyl ether, heptoxymethoxymethyl benzyl ether, decoxymethoxymethyl benzyl ether, pentadecoxymethoxymethyl benzyl ether, methoxymethoxymethoxymethyl benzyl ether, ethoxymethoxymethoxymethyl benzyl ether, propoxymethoxymethoxymethyl benzyl ether, butoxymethoxymethoxymethyl benzyl ether, decoxymethoxymethoxymethyl benzyl ether, undecoxymethoxymethoxymethyl benzyl ether, heptadecoxymethoxymethoxymethyl benzyl ether, hydroxymethyl benzyl ether, hydroxymethoxymethoxymethyl benzyl ether, hydroxymethoxymethoxymethyl benzyl ether, methoxymethyl 2-benzyl ether, propoxymethyl 2-benzyl ether, hexoxymethyl 2-benzyl ether, decoxymethyl 2-benzyl ether, tridecoxymethyl 2-benzyl ether, ethoxymethoxymethyl 2-benzyl ether, butoxymethoxymethyl 2-benzyl ether, decoxymethoxymethyl 2-benzyl ether, methoxymethoxymethoxymethyl 2-benzyl ether, propoxymethoxymethoxymethyl 2-benzyl ether, decoxymethoxymethoxymethyl 2-benzyl ether, heptadecoxymethoxymethoxymethyl 2-benzyl ether, hydroxymethoxymethoxymethyl 2-benzyl ether, ethoxymethyl 3-ethylbenzyl ether, butoxymethyl 3-ethylbenzyl ether, heptoxymethyl 3-ethylbenzyl ether, dodecoxymethyl 3-ethylbenzyl ether, methoxymethoxymethyl 3-ethylbenzyl ether, propoxymethoxymethyl 3-ethylbenzyl ether, heptoxymethoxymethyl 3-ethylbenzyl ether, pentadecoxymethoxymethyl 3-ethylbenzyl ether, ethoxymethoxymethoxymethyl 3-ethylbenzyl ether, butoxymethoxymethoxymethyl 3-ethylbenzyl ether, undecoxymethoxymethoxymethyl 3-ethylbenzyl ether, hydroxymethyl 3-ethylbenzyl ether, hydroxymethoxymethoxymethoxymethyl 3 - ethylbenzyl ether, methoxymethyl 3-phenyl benzyl ether, propoxymethyl 3-phenylbenzyl ether, hexoxymethyl 3-phenylbenzyl ether, decoxymethyl 3-phenylbenzyl ether, tridecoxymethyl 3 - phenylbenzyl ether, ethoxymethoxymethyl 3-phenylbenzyl ether, butoxymethoxymethyl 3-phenylbenzyl ether, decoxymethoxymethyl 3-phenylbenzyl ether, methoxy methoxymethoxymethyl 3-phenylbenzyl ether, propoxymethoxymethoxymethyl 3-phenylbenzyl ether, decoxymethoxymethoxymethyl 3-phenylbenzyl ether, heptadecoxymethoxymethoxymethyl 3-phenylbenzyl ether, hydroxymethoxymethoxymethyl 3-phenylbenzyl ether, ethoxymethyl 2,4-dimethylbenzyl ether, butoxymethyl 2,4-dimethylbenzyl ether, heptoxymethyl 2,4-dimethylbenzyl ether, dodecoxymethyl 2,4-dimethylbenzyl ether, methoxymethoxymethyl 2,4-dimethylbenzyl ether, propoxymethoxymethyl 2,4-dimethylbenzyl ether, heptoxymethoxymethyl 2,4-dimethylbenzyl ether, pentadecoxymethoxymethyl 2,4-dimethylbenzyl ether, ethoxymethoxymethoxymethyl 2,4-dimethylbenzyl ether, butoxymethoxymethoxymethyl 2,4-dimethylbenzyl ether, undecoxymethoxymethoxymethyl 2,4-dimethylbenzyl ether, hydroxymethyl 2,4-